United States Patent [19]

Fleischer et al.

[11] 4,374,768
[45] Feb. 22, 1983

[54] DISPERSE DYES FROM 5-AMINO-4-HALO-3-METHYLISOTHIAZOLES

[75] Inventors: Jean C. Fleischer; Gary T. Clark; Ronald J. Maner, all of Kingsport, Tenn.

[73] Assignee: Eastman Kodak Company, Rochester, N.Y.

[21] Appl. No.: 254,705

[22] Filed: Apr. 16, 1981

Related U.S. Application Data

[63] Continuation of Ser. No. 159,422, Jun. 16, 1980, abandoned, which is a continuation of Ser. No. 970,072, Dec. 18, 1978, abandoned.

[51] Int. Cl.$^3$ .............................................. C09B 29/22
[52] U.S. Cl. ................................................... 260/158
[58] Field of Search ......................................... 260/158

[56] References Cited

U.S. PATENT DOCUMENTS 3,657,215 4/1972 Weaver et al. ............... 260/158
4,079,050 3/1978 Baird et al. ................... 260/152

FOREIGN PATENT DOCUMENTS 2209839 3/1971 Fed. Rep. of Germany ...... 260/158
1379233 1/1975 United Kingdom ............... 260/158

Primary Examiner—John F. Niebling
Attorney, Agent, or Firm—Donald W. Spurrell; Daniel B. Reece, III

[57] ABSTRACT

Disclosed are monoazo dyes derived from diazotized 5-amino-4-halo-3-methylisothiazoles and m-acylaminoaniline couplers. These dyes impart scarlet and red shades on nylon and polyester fibers and exhibit good fastness properties. The dyes are represented by the general formula:

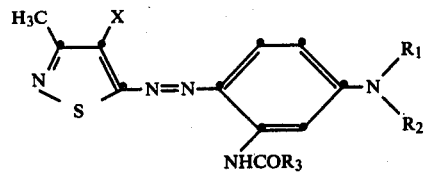

wherein $R_1$ and $R_2$ are each selected from lower alkyl, cycloalkyl, substituted cycloalkyl, or lower alkyl substituted with phenyl, cyano, sulfonamido, carboxamido, alkoxy, hydroxy, or an imide radical; $R_3$ is lower alkyl, lower alkyl substituted as above, phenyl, or trifluoromethyl; and X is chlorine or bromine.

3 Claims, No Drawings

DISPERSE DYES FROM 5-AMINO-4-HALO-3-METHYLISOTHIAZOLES

This is a continuation of Application Ser. No. 159,422 filed June 16, 1980 abandoned which is a continuation of Ser. No. 970,072, filed Dec. 18, 1978, now abandoned.

This invention concerns monoazo dyes derived from 5-amino-4-halo-3-methylisothiazoles which impart red shades to nylon and polyester and exhibit good fastness properties such as light and color. These dyes are represented by the general formula:

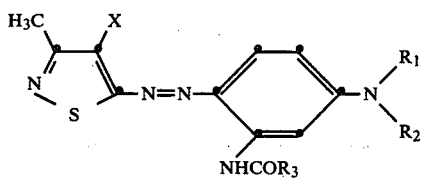

wherein $R_1$ and $R_2$ are each selected from lower alkyl, cycloalkyl, substituted cycloalkyl, or lower alkyl substituted with phenyl, cyano, sulfonamido, carboxamido, alkoxy, hydroxy, or an imide radical; $R_3$ is lower alkyl, substituted lower alkyl, phenyl, or trifluoromethyl; and X is chlorine or bromine.

Dyes of this general type are disclosed in British Pat. No. 1,379,233 and German Pat. No. 2,209,839. However, applicants' dyes exhibit markedly better light and other fastness properties.

The dyes of this invention produce bright red shades on polyester fiber and fabrics, have excellent light, ozone, wash, crock, gas, sublimation, acid, or alkaline perspiration and sublimation fastness properties, and have excellent build and dye rate characteristics. An advantage of these dyes is the ability to dye textured polyester by all methods of application (boil, pressure, heat fixation) with excellent reproducibility of shade. These dyes in particular have excellent dyeability and fastness properties on many types of polyester carpet with good migration properties.

The 5-amino-3-methylisothiazole moiety is prepared by known techniques (Chemische Berichte, 94, pages 2950, ff. 1961). Acetylation, halogenation and subsequent hydrolysis yields the appropriate 5-amino-4-halo-3-methylisothiazole. The m-acylaminoaniline couplers are also prepared by known techniques. Generally, standard alkylation, cyanoethylation, hydroxyethylation, and the like are used to introduce substituents onto the nitrogen atom of the aniline.

This invention will be further illustrated by the following examples although it will be understood that these examples are included merely for purposes of illustration and are not intended to limit the scope of the invention.

EXAMPLE 1

To 5 ml. of concentrated $H_2SO_4$ is added 0.72 g. of sodium nitrite below 80° C. The solution is cooled and 10 ml. of 1:5 acid (one part propionic:five parts acetic acid) is added portionwise below 20° C. The mixture is cooled further and 5-amino-4-bromo-3-methylisothiazole is added, followed by 10 ml. more 1:5 acid, all below 0°–5° C. After stirring for two hours at 0°–5° C., the diazonium solution is added slowly with stirring to an ice cold solution of N,N-diethyl-m-acetamidoaniline (2.06 g.) in 25 ml. 1:5 acid. The pH of the coupling mixture is adjusted to Congo Red by the addition of ammonium acetate and coupling is allowed one hour at 10° C. The coupling mixture is drowned in water to precipitate the dye which is collected by filtration, washed with water, and air-dried. The dye imparts red shades to polyester and polyamide and the dyeing has good fastness properties.

EXAMPLE 2

Using the procedure described in Example 1, 5-amino-4-chloro-3-methylisothiazole is diazotized and added to a chilled solution of N,N-diethyl-m-acetamidoaniline (2.06 g.) dissolved in 25 ml. 1:5 acid. The dye obtained in a manner analogous to Example 1 imparts red color to polyester and nylon.

The dye in the following table were prepared as above.

| Example | X | $R_1$ | $R_2$ | $R_3$ |
|---|---|---|---|---|
| 3 | Br | n-$C_3H_7$ | n-$C_3H_7$ | $CH_3$ |
| 4 | Cl | n-$C_3H_7$ | n-$C_3H_7$ | $CH_3$ |
| 5 | Br | $C_2H_5$ | n-$C_3H_7$ | $CH_3$ |
| 6 | Cl | $C_2H_5$ | n-$C_3H_7$ | $CH_3$ |
| 7 | Br | $C_2H_5$ | $C_2H_4CONH_2$ | $CH_3$ |
| 8 | Cl | $C_2H_5$ | $C_2H_4CONH_2$ | $CH_3$ |
| 9 | Br | $C_2H_5$ | $C_2H_4SO_2NH_2$ | $CH_3$ |
| 10 | Cl | $C_2H_5$ | $C_2H_4SO_2NH_2$ | $CH_3$ |
| 11 | Br | $C_2H_5$ | $C_2H_4CN$ | $CH_3$ |
| 12 | Cl | $C_2H_5$ | $C_2H_4CN$ | $CH_3$ |
| 13 | Br | $C_2H_5$ | $CH_2$—$C_6H_5$ | $CH_3$ |
| 14 | Cl | $C_2H_5$ | $CH_2$—$C_6H_5$ | $CH_3$ |
| 15 | Br | $C_2H_5$ | $C_2H_4N(COCH_2)_2$ | $CH_3$ |
| 16 | Cl | $C_2H_5$ | $C_2H_4N(COCH_2)_2$ | $CH_3$ |
| 17 | Br | $CH_2$—$C_6H_5$ | $CH_2$—$C_6H_5$ | $CH_3$ |
| 18 | Cl | $CH_2$—$C_6H_5$ | $CH_2$—$C_6H_5$ | $CH_3$ |
| 19 | Br | $C_2H_5$ | $C_2H_4N(SO_2CH_3)(CH_2C_6H_5)$ | $CH_3$ |
| 20 | Cl | $C_2H_5$ | $C_2H_4N(SO_2CH_3)(CH_2C_6H_5)$ | $CH_3$ |
| 21 | Br | $C_2H_5$ | $C_2H_4OCH_3$ | $CH_3$ |
| 22 | Cl | $C_2H_5$ | $C_2H_4OCH_3$ | $CH_3$ |
| 23 | Br | $C_2H_5$ | $C_2H_4OC_2H_4OC_2H_5$ | $CH_3$ |
| 24 | Cl | $C_2H_5$ | $C_2H_4OC_2H_4OC_2H_5$ | $CH_3$ |
| 25 | Br | $C_2H_5$ | Cyclohexyl | $CH_3$ |
| 26 | Cl | $C_2H_5$ | Cyclohexyl | $CH_3$ |
| 27 | Br | $C_2H_5$ | $C_2H_4NHCOCH_3$ | $CH_3$ |
| 28 | Cl | $C_2H_5$ | $C_2H_4NHCOCH_3$ | $CH_3$ |
| 29 | Br | $C_2H_5$ | $C_2H_4OC_2H_4OH$ | $CH_3$ |
| 30 | Cl | $C_2H_5$ | $C_2H_4OC_2H_4OH$ | $CH_3$ |
| 31 | Br | $C_2H_4OH$ | $C_2H_4OH$ | $CH_3$ |

-continued

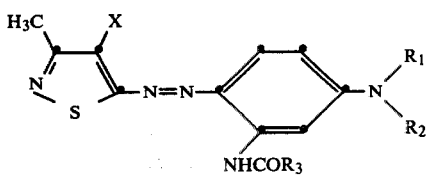

| Example | X | R₁ | R₂ | R₃ |
|---------|---|------|------|-----|
| 32 | Cl | C₂H₄OH | C₂H₄OH | CH₃ |
| 33 | Br | C₂H₅ | 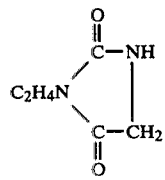 | CH₃ |
| 34 | Cl | C₂H₅ | 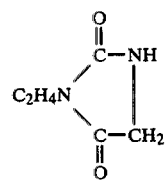 | CH₃ |
| 35 | Br | C₂H₅ | 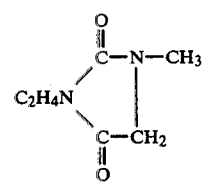 | CH₃ |
| 36 | Cl | C₂H₅ | 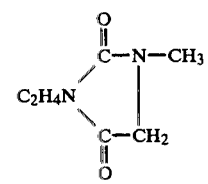 | CH₃ |
| 37 | Br | C₂H₅ | 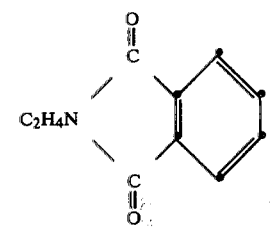 | CH₃ |

-continued

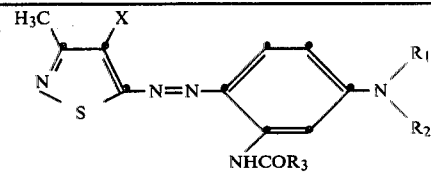

| Example | X | R₁ | R₂ | R₃ |
|---------|---|-----|-----|-----|
| 38 | Cl | C₂H₅ | 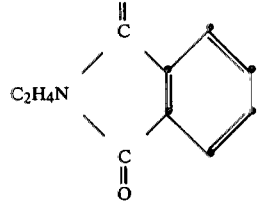 | CH₃ |

Although the invention has been described in considerable detail with particular reference to certain preferred embodiments thereof, variations and modifications can be effected within the spirit and scope of the invention.

We claim:

1. Monoazo dyes of the general formula:

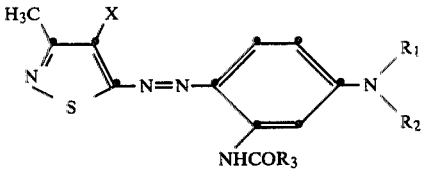

wherein R₁ and R₂ are each selected from lower alkyl, cyclohexyl, and alkyl substituted with carbamoyl, sulfamoyl, —CN, phenyl, succinimido, —N(-SO₂CH₃)CH₂C₆H₅, lower alkoxy, lower alkoxyalkoxy, lower alkanoylamino, hydroxy substituted lower alkoxy, hydroxy, phthalimido,

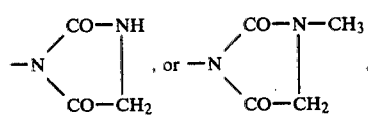

and wherein only one of R₁, and R₂ can be unsubstituted alkyl; R₃ is lower alkyl, lower alkyl substituted as above, phenyl, or trifluoromethyl; and X is chlorine or bromine.

2. A compound according to claim 1 of the formula

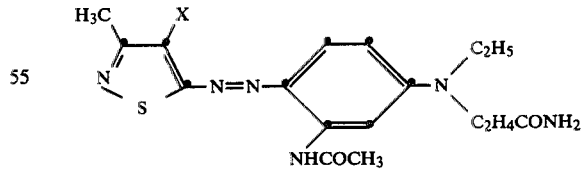

where X is chlorine or bromine.

3. A compound according to claim 1 of the formula

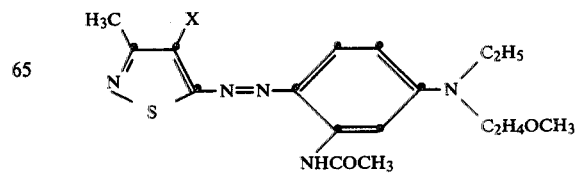

where X is chlorine or bromine.

* * * * *